US011292336B2

United States Patent
Kawase et al.

(10) Patent No.: US 11,292,336 B2
(45) Date of Patent: Apr. 5, 2022

(54) VEHICLE EQUIPPED WITH HIGH PRESSURE TANK

(71) Applicant: HONDA MOTOR CO., LTD., Tokyo (JP)

(72) Inventors: Satoru Kawase, Wako (JP); Naoki Ogiwara, Wako (JP); Kazuyuki Kadowaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 262 days.

(21) Appl. No.: 16/773,148

(22) Filed: Jan. 27, 2020

(65) Prior Publication Data

US 2020/0238820 A1 Jul. 30, 2020

(30) Foreign Application Priority Data

Jan. 28, 2019 (JP) .............................. JP2019-012067

(51) Int. Cl.
*B60K 15/035* (2006.01)
*F17C 1/04* (2006.01)
*B60K 15/03* (2006.01)

(52) U.S. Cl.
CPC .............. *B60K 15/035* (2013.01); *F17C 1/04* (2013.01); *B60K 2015/03315* (2013.01); *B60K 2015/03547* (2013.01); *B60K 2015/03557* (2013.01)

(58) Field of Classification Search
CPC ........ B60K 15/035; B60K 2015/03315; B60K 2015/03547; B60K 2015/03557;
(Continued)

(56) References Cited

U.S. PATENT DOCUMENTS 5,596,971 A * 1/1997 Kidokoro ......... B60K 15/03504
123/516
6,453,885 B1 * 9/2002 Short ............... B60K 15/03177
123/516
(Continued)

FOREIGN PATENT DOCUMENTS

CN 108561752 A 9/2018
JP 2009-243675 A 10/2009
(Continued)

OTHER PUBLICATIONS

Office Action dated Oct. 27, 2020 issued over the corresponding Japanese Patent Application No. 2019-012067 with the English translation thereof.

*Primary Examiner* — Shawn M Braden
(74) *Attorney, Agent, or Firm* — Carrier Blackman & Associates, P.C.; Joseph P. Carrier; William D. Blackman

(57) ABSTRACT

A vehicle equipped with a high pressure tank has mounted in the interior of a vehicle body a high pressure tank having a resin liner and a reinforced layer, the vehicle comprising a tank chamber, a filling port, a concave portion in which the filling port and a ventilation port are disposed, a fuel lid capable of opening and closing an opening of the concave portion, and a ventilation passage that allows communication between the ventilation port and the tank chamber. When the fuel lid is opened, the ventilation port is opened to the exterior of the vehicle body, whereas when the fuel lid is closed, the ventilation port is covered by the fuel lid in a state in which the ventilation port is allowed to communicate with the exterior of the vehicle body.

7 Claims, 3 Drawing Sheets

(58) Field of Classification Search
CPC .......... B60K 15/04; B60K 2015/03538; B60K 2015/0458; B60K 15/03006; B60K 2015/03552; B60K 2015/03585; F17C 1/04
USPC ....................................................... 220/303
See application file for complete search history.

(56) References Cited

U.S. PATENT DOCUMENTS

| | | | |
|---|---|---|---|
| 9,457,649 B2 * | 10/2016 | Fujiwara | B60K 15/04 |
| 9,464,758 B2 | 10/2016 | Kojima et al. | |
| 9,725,010 B2 | 8/2017 | Suzuki et al. | |
| 2007/0000574 A1 * | 1/2007 | DeCapua | B60K 15/04 141/350 |
| 2011/0303690 A1 * | 12/2011 | Lay | B60K 15/035 220/746 |
| 2012/0074137 A1 * | 3/2012 | Randolph | B60K 15/0406 220/86.2 |
| 2015/0152816 A1 * | 6/2015 | Fujiwara | B60K 15/03504 137/587 |
| 2019/0047411 A1 * | 2/2019 | Kataoka | F17C 13/084 |

FOREIGN PATENT DOCUMENTS

| | | |
|---|---|---|
| JP | 2016-047671 A | 4/2016 |
| WO | 2014/054251 A1 | 4/2014 |

* cited by examiner

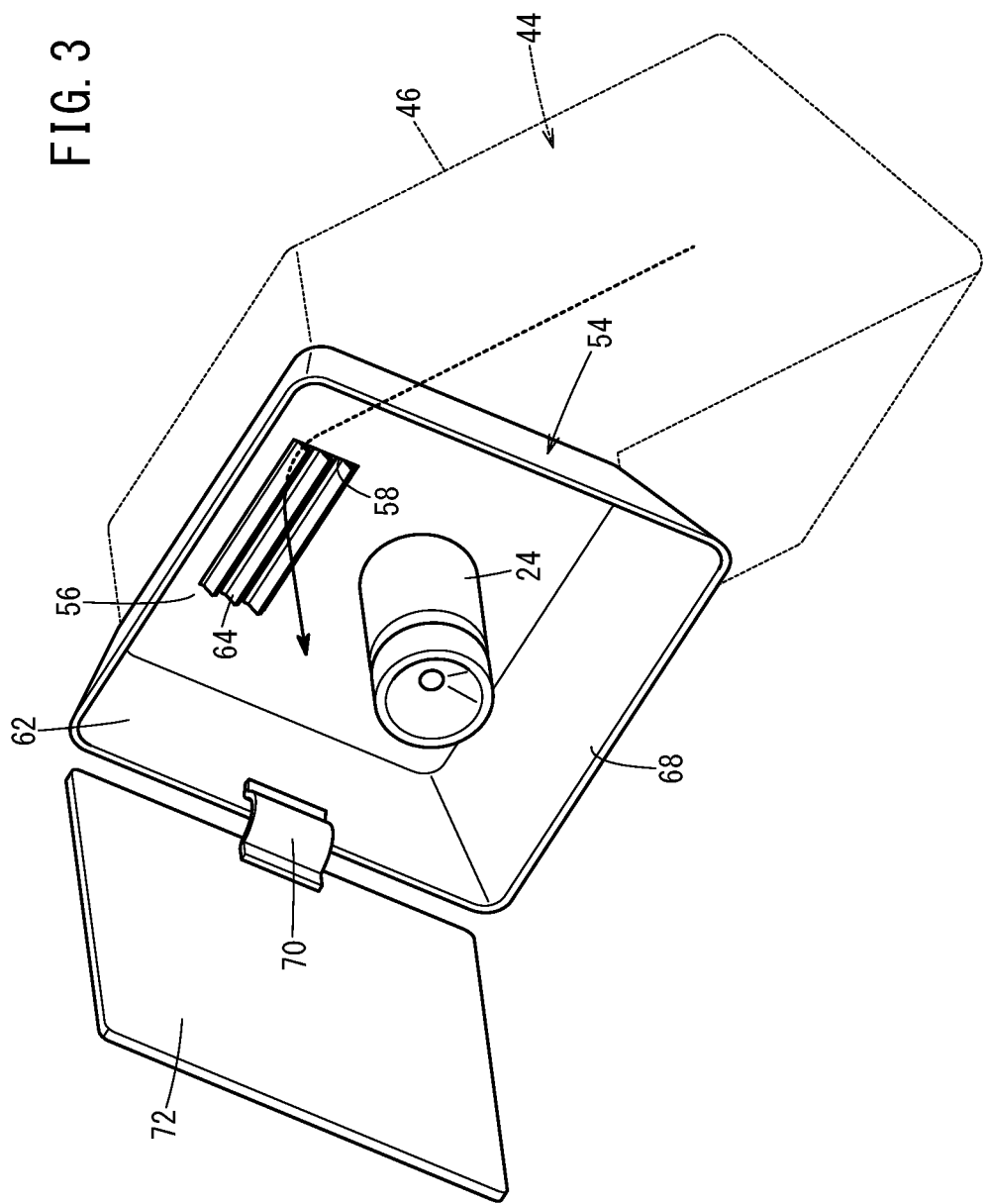

VEHICLE EQUIPPED WITH HIGH PRESSURE TANK

CROSS-REFERENCE TO RELATED APPLICATION

This application is based upon and claims the benefit of priority from Japanese Patent Application No. 2019-012067 filed on Jan. 28, 2019, the contents of which are incorporated herein by reference.

BACKGROUND OF THE INVENTION

Field of the Invention

The present invention relates to a vehicle equipped with a high pressure tank in which there is mounted in the interior of a vehicle body a high pressure tank having a resin liner capable of storing hydrogen gas therein, and a reinforced layer that covers an outer surface of the liner.

Description of the Related Art

For example, as disclosed in Japanese Laid-Open Patent Publication No. 2009-243675, in a tank having a resin liner and a reinforced layer that covers an outer surface of the liner, hydrogen gas that is stored inside the liner may penetrate through the liner, and enter into an interval (hereinafter also referred to as a covered portion) between the outer surface of the liner and the reinforced layer. The hydrogen gas that has entered into the covered portion penetrates further through the reinforced layer and is released to the exterior of the high pressure tank, and is released to the exterior of the high pressure tank from an opening or the like provided in the reinforced layer in order to enable a mouthpiece of the high pressure tank to be exposed. Since the hydrogen gas that has passed through the liner and is released to the exterior of the high pressure tank (hereinafter also referred to as a "temporarily released gas") is temporarily generated in a limited amount, as part of the normal operations of the high pressure tank, it is preferable to perform discharging to the exterior of the vehicle equipped with the high pressure tank.

SUMMARY OF THE INVENTION

Incidentally, during traveling or the like of the vehicle equipped with the high pressure tank, when the hydrogen gas is discharged from the high pressure tank so as to be supplied to a fuel cell, the internal pressure of the tank (the gas pressure inside the liner) is decreased. When the internal pressure of the tank decreases, since the pressing force at which the hydrogen gas presses the liner toward the reinforced layer also decreases, it becomes easy for the hydrogen gas inside the liner to penetrate through the liner and enter into the covered portion.

Generally, filling of hydrogen gas into the high pressure tank is carried out in a state in which the internal pressure of the tank is decreased. For this reason, in the high pressure tank which is required to be filled with the hydrogen gas, a larger amount of the hydrogen gas becomes more likely to enter into the covered portion in comparison with a situation in which the high pressure tank is completely filled. Further, when the internal pressure of the tank increases due to the hydrogen gas being filled in the high pressure tank, the pressing force at which the hydrogen gas presses the liner toward the reinforced layer also increases. Therefore, the hydrogen gas, which has entered into the covered portion in a large amount in the manner described above, is pushed by the liner, and is easily released to the exterior of the high pressure tank. Stated otherwise, the temporarily released gas becomes likely to be generated when the hydrogen gas is filled into the high pressure tank.

The present invention has been devised with the aim of solving the aforementioned problems, and has the object of providing a vehicle equipped with a high pressure tank, in which it is possible to suitably perform ventilation of a tank chamber even at a time when hydrogen gas is filled in the high pressure tank, thereby effectively discharging the temporarily released gas to the exterior of the vehicle body.

An aspect of the present invention is characterized by a vehicle equipped with a high pressure tank in which there is mounted in the interior of a vehicle body a high pressure tank having a resin liner capable of storing hydrogen gas therein, and a reinforced layer that covers an outer surface of the liner, the vehicle equipped with the high pressure tank comprising a tank chamber in which the high pressure tank is accommodated, a filling port capable of being connected to a hydrogen gas supply source externally of the vehicle body in order to fill the hydrogen gas into an interior of the high pressure tank, a concave portion provided on an outer panel of the vehicle, and to which the filling port is fixed, a fuel lid capable of opening and closing an opening of the concave portion, a ventilation port disposed in the concave portion, and a ventilation passage that allows communication between the ventilation port and the tank chamber, wherein, when the fuel lid is opened, the ventilation port is opened to the exterior of the vehicle body, and when the fuel lid is closed, the ventilation port is covered by the fuel lid in a state in which the ventilation port is allowed to communicate with the exterior of the vehicle body.

According to the present invention, the ventilation port for allowing the tank chamber to communicate with the exterior of the vehicle body is covered by the fuel lid in a state of being allowed to communicate with the exterior of the vehicle body. Therefore, for example, at a time when the vehicle equipped with the high pressure tank is traveling, the tank chamber can be ventilated through the vent port, even in a state in which the vent port is covered by the fuel lid.

The fuel lid is opened when the hydrogen gas is filled into the high pressure tank. Consequently, since the ventilation port can be exposed and made to face toward the exterior of the vehicle body, it becomes possible to suitably perform ventilation of the tank chamber through the ventilation port. Therefore, it becomes possible to suitably perform ventilation of the tank chamber even at a time that filling of the hydrogen gas makes it easy for the temporarily released gas to be generated in the interior of the tank chamber, and for the temporarily released gas to be effectively discharged to the exterior of the vehicle body.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 3 is an enlarged perspective view showing an example in which a louver structure is provided for the ventilation port shown in FIG. 2.

DESCRIPTION OF THE PREFERRED EMBODIMENTS

Figure 1:
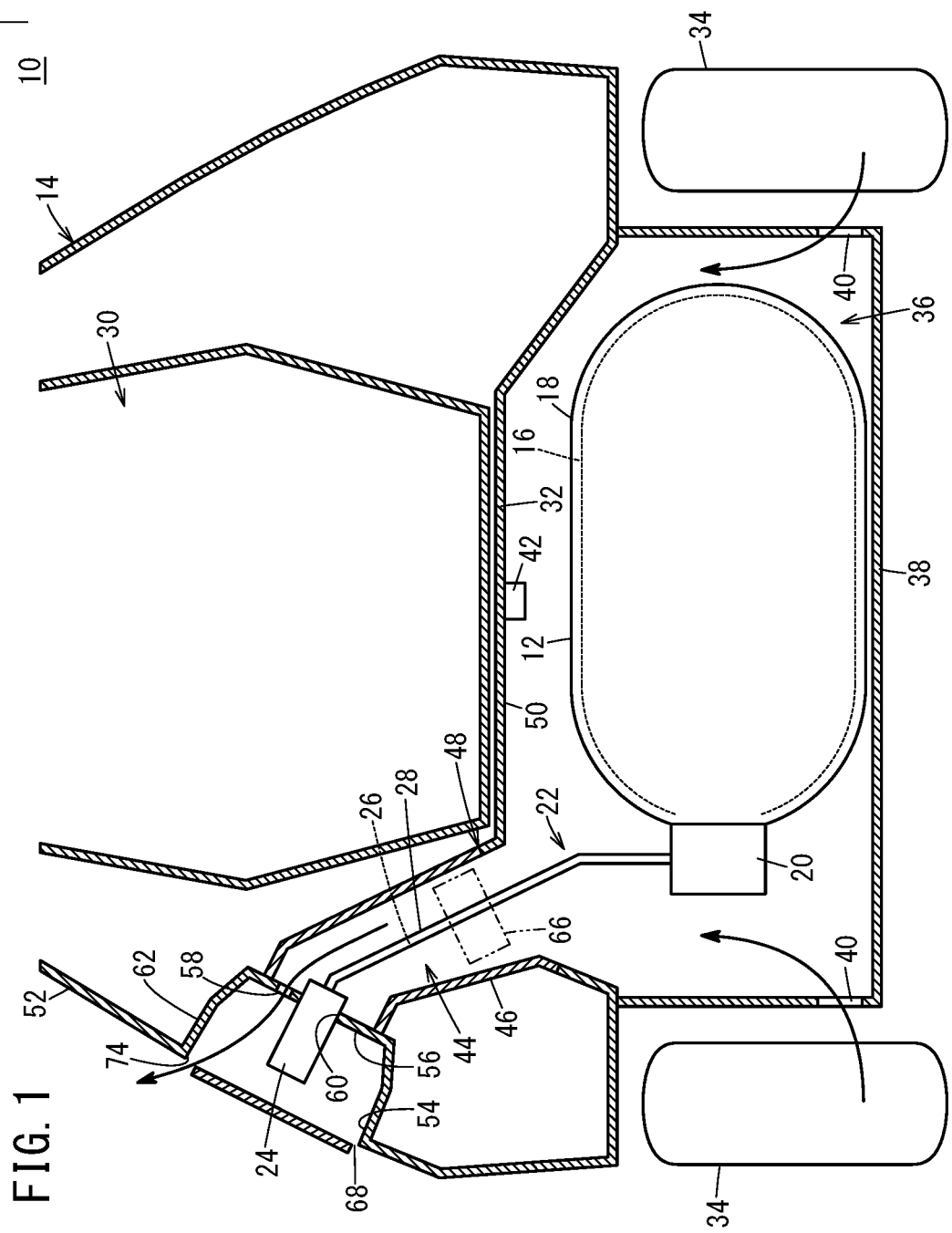
FIG. 1 is a schematic cross-sectional view of essential components of a vehicle equipped with a high pressure tank according to an embodiment of the present invention.

A preferred embodiment of a vehicle in which there is mounted a high pressure gas tank according to the present invention will be presented and described in detail below with reference to the accompanying drawings. In the drawings discussed below, structural elements exhibiting the same or similar functions and effects are denoted by the same reference numerals, and repeated description of such components may be omitted.

As shown in FIG. 1, a vehicle equipped with a high pressure tank (hereinafter, also referred to simply as an "equipped vehicle") 10 according to the present embodiment is, for example, a fuel cell vehicle, and a high pressure tank 12, in which there is stored hydrogen gas that is supplied to the non-illustrated fuel cell vehicle, is mounted in the interior of a vehicle body 14.

The high pressure tank 12 includes a resin liner 16 made up from a hollow body capable of storing hydrogen gas in the interior thereof, a reinforced layer 18 made of fiber reinforced plastic (CFRP) that covers an outer surface of the liner 16, and a metal mouthpiece 20 provided at one end in the axial direction of the high pressure tank 12. It should be noted that mouthpieces 20 may also be provided respectively at both ends in the axial direction of the high pressure tank 12.

Although not illustrated, for example, an insertion hole that enables communication between the interior and the exterior of the liner 16 is formed in the mouthpiece 20, and an insertion member is inserted into such an insertion hole. A main stop valve (not shown) or the like is integrally incorporated in the insertion member. The high pressure tank 12 is connected via the insertion member to a hydrogen gas supply and discharge line 22, and when the main stop valve is in an opened state, the hydrogen gas can be supplied and discharged between the supply and discharge line 22 and the interior of the liner 16, whereas when the main stop valve is closed, the supply and discharge of hydrogen gas is stopped.

Moreover, in FIG. 1, within the supply and discharge line 22, a filling pipe 28 is shown that allows communication between the interior of the high pressure tank 12 (liner 16) and a later-described filling port 24, and forms a filling passage 26 through which the hydrogen gas which is supplied from the exterior of the vehicle body 14 through the filling port 24 flows into the interior of the liner 16. In addition to the filling passage 26, in the supply and discharge line 22, there is included, for example, a discharge passage or the like (not shown) for supplying to the fuel cell the hydrogen gas that is discharged from the high pressure tank 12.

In the high pressure tank 12, the hydrogen gas that is stored inside the liner 16 may penetrate through the liner 16 and enter into an interval (hereinafter also referred to as a covered portion) between the outer surface of the liner 16 and the reinforced layer 18. The hydrogen gas that has entered into the covered portion penetrates further through the reinforced layer 18 and is released to the exterior of the high pressure tank 12, or is released to the exterior of the high pressure tank through an opening (not shown) or the like provided in the reinforced layer 18 in order to enable a mouthpiece 20 of the high pressure tank 12 to be exposed. The hydrogen gas that has passed through the liner 16 and is released to the exterior of the high pressure tank 12, hereinafter, is also referred to as a "temporarily released gas".

The high pressure tank 12 is accommodated, for example, in a tank chamber 36 disposed below a cabin 30 and an under panel 32 of the vehicle body 14, and between the vehicle wheels 34 in a vehicle widthwise direction. The tank chamber 36 is formed by a cover 38 and a portion of the under panel 32, and the temporarily released gas is capable of being accommodated therein. It should be noted that the tank chamber 36 may be formed from only a portion of the under panel 32 without necessarily including the cover 38. A plurality of openings 40 through which air is capable of flowing into the tank chamber 36 from the exterior of the vehicle body 14 are provided on a lower part of the cover 38. Moreover, the shape, the number, and the arrangement, etc., of the openings 40 are not particularly limited.

A concentration sensor 42, which detects the concentration of hydrogen gas inside the tank chamber 36, is provided at a more upward location in the interior of the tank chamber 36 than the high pressure tank 12. Further, the tank chamber 36 is in communication with a ventilation passage 44. The ventilation passage 44 is formed in the interior of a ventilation passage forming wall 46, and extends upwardly from the tank chamber 36. More specifically, a connecting part 48 between a lower end of the ventilation passage forming wall 46 and the under panel 32, or in other words, a connecting part 48 between the ventilation passage 44 and the tank chamber 36 is disposed on a ceiling portion 50 of the tank chamber 36.

Figure 2:
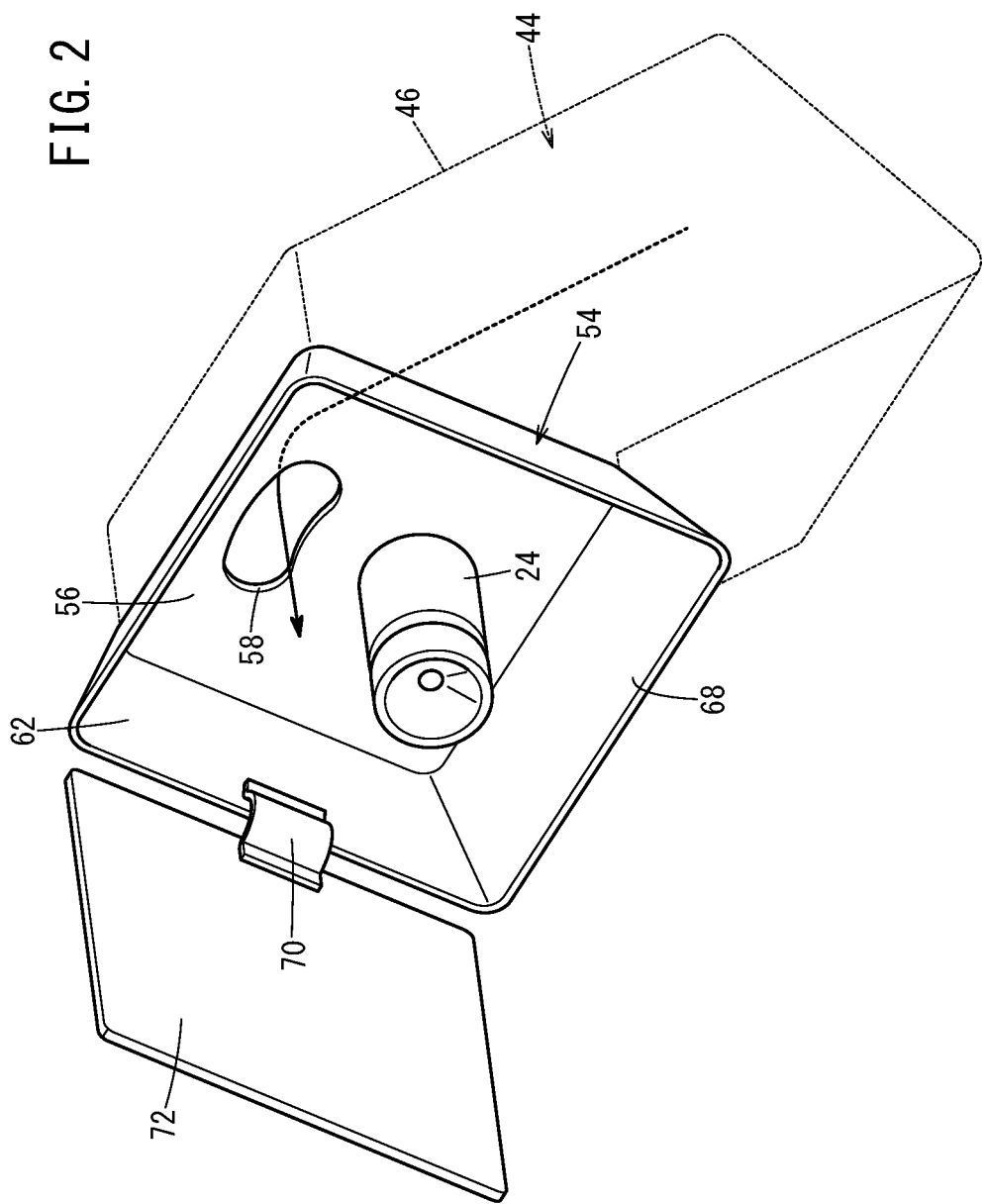
FIG. 2 is an enlarged perspective view of the vicinity of a ventilation port of the vehicle equipped with the high pressure tank shown in FIG. 1.

A concave portion 54, which is inwardly recessed toward the interior of the vehicle body 14, is formed on an outer panel 52 of the vehicle body 14, and the upper end of the ventilation passage forming wall 46 is connected to a bottom wall 56 of the concave portion 54. As shown in FIGS. 1 and 2, the filling port 24 and the ventilation port 58 are disposed on an inner side of the concave portion 54.

The filling port 24 is fixed to the bottom wall 56 in a manner so as to protrude from the inside of the ventilation passage 44 toward the inside of the concave portion 54 via a through hole 60 provided in the bottom wall 56. Further, the filling pipe 28 is connected to a proximal end side of the filling port 24. More specifically, according to the present embodiment, the filling pipe 28 passes through the interior of the ventilation passage 44 and the interior of the tank chamber 36, and extends between the filling port 24 and the insertion member of the high pressure tank 12.

Although none of these features are illustrated, a filling nozzle of a hydrogen gas supply device, which serves as a hydrogen gas supply source provided at a hydrogen gas station or the like, is connected to a distal end side of the filling port 24 at a time that the hydrogen gas is filled into the high pressure tank 12. Consequently, the hydrogen gas is supplied via the filling port 24 from the hydrogen gas supply device, which is located externally of the vehicle body 14, to the filling passage 26.

In the vicinity of the filling port 24, for example, a hydrogen sensor (not shown) may be provided for detecting whether or not hydrogen gas is leaking between the filling nozzle and the filling port 24 that is connected to the filling nozzle, at a time of being filled with hydrogen gas.

The ventilation port 58 is formed to penetrate through the bottom wall 56 of the concave portion 54 at a more upward location than the filling port 24. The ventilation port 58 and the tank chamber 36 are in communication with each other via the ventilation passage 44. Therefore, the tank chamber 36 is ventilated through the openings 40 provided in the cover 38, the ventilation passage 44, and the ventilation port 58. Moreover, instead of the bottom wall 56 of the concave portion 54, the ventilation port 58 may be provided on a side wall 62 or the like of the concave portion 54. In this case, the upper end of the ventilation passage forming wall 46 may be connected to the side wall 62 of the concave portion 54 or the like, in order to allow the ventilation port 58 and the ventilation passage 44 to communicate with each other.

Further, the shape and dimensions of the ventilation port 58, as well as the number of ventilation ports, etc., are not particularly limited. For example, instead of one individual ventilation port 58 having the shape shown in FIG. 2, a plurality of ventilation ports (not shown) having openings that are smaller than the ventilation port 58 may be provided on the inner side of the concave portion 54. Furthermore, as shown in FIG. 3, a louver structure 64 may be provided for the ventilation port 58. In this case, rainwater or the like can be prevented from entering into the ventilation passage 44 or the tank chamber 36 through the ventilation port 58.

A blower 66 is disposed in the interior of the ventilation passage 44. By driving the blower 66, it is possible to allow air to flow from the tank chamber 36 toward the ventilation port 58. Moreover, instead of being disposed in the interior of the ventilation passage 44, the blower 66 may be disposed in the interior of the tank chamber 36.

As shown in FIG. 2, in the vicinity of the opening 68 of the concave portion 54, for example, a fuel lid 72 is attached via a hinge 70 so as to enable the opening 68 to be opened and closed. By opening the fuel lid 72 and placing the opening 68 in a released state, the ventilation port 58 and the filling port 24 face toward the exterior of the vehicle body 14.

On the other hand, as shown in FIG. 1, by the opening 68 being covered with the fuel lid 72, the filling port 24 and the ventilation port 58 disposed on the inner side of the concave portion 54 are also covered by the fuel lid 72. For example, by adjusting a dimensional relationship between each of the fuel lid 72 and the opening 68, or by providing a spacer (not shown) mutually between the fuel lid 72 and the opening 68, a gap 74 is formed between the fuel lid 72 that has covered the opening 68, and a peripheral edge portion of the opening 68 of the outer panel 52. Therefore, even in a state in which the ventilation port 58 is covered by the fuel lid 72, the ventilation port 58 and the exterior of the vehicle body 14 can remain in communication with each other via the gap 74. More specifically, even in a state in which the fuel lid 72 is closed, as shown by the arrows in FIG. 1, the tank chamber 36 is ventilated through the openings 40, the ventilation passage 44, the ventilation port 58, and the gap 74.

The equipped vehicle 10 according to the present embodiment is basically configured in the manner described above. In such an equipped vehicle 10, in an opened state of the main stop valve, hydrogen gas that is discharged from the interior of the high pressure tank 12 into the discharge flow passage is supplied to the fuel cell, and is consumed in electrochemical reactions (power generating reactions) that take place in the fuel cell. The equipped vehicle 10 can be made to travel using the electrical power obtained by the electrochemical reactions.

During traveling or the like of the equipped vehicle 10, although the fuel lid 72 is closed, in the manner described above, the ventilation port 58 communicates with the exterior of the vehicle body 14 through the gap 74. More specifically, the fuel lid 72 covers the ventilation port 58 in a state in which the ventilation port 58 is allowed to communicate with the exterior of the vehicle body 14. Therefore, the air that has flowed into the tank chamber 36 through the openings 40 from the exterior of the vehicle body 14 flows through the ventilation passage 44 toward the ventilation port 58, flows out to the inner side of the concave portion 54 via the ventilation port 58, and furthermore, flows out to the exterior of the vehicle body 14 via the gap 74. Due to flowing of the air, the temporarily released gas inside the tank chamber 36 can be discharged to the exterior of the vehicle body 14 through the gap 74.

During traveling or the like of the equipped vehicle 10, a traveling wind is generated around the periphery of the vehicle body 14. Further, as will be described later, when the equipped vehicle 10 is traveling, it is less likely that the temporarily released gas will be generated in comparison with a time when the hydrogen gas is filled. Therefore, even if the ventilation port 58 is covered by the fuel lid 72 in the manner described above, it is possible to suppress a situation in which the temporarily released gas accumulates inside the tank chamber 36. Moreover, if necessary, the blower 66 may be driven to promote the ventilation of the tank chamber 36.

In the case that the internal pressure of the high pressure tank 12 is decreased to a value where it is determined that filling of the hydrogen gas is required, the equipped vehicle 10 is brought to a stop at a hydrogen gas station or the like, and filling of the hydrogen gas with respect to the high pressure tank 12 is carried out. More specifically, the fuel lid 72 of the equipped vehicle 10 that has been stopped is opened, and the filling nozzle of the hydrogen gas supply device is connected to the filling port 24 that is exposed to the exterior of the vehicle body 14. Then, the hydrogen gas is supplied via the filling port 24 from the hydrogen gas supply device into the filling passage 26.

Incidentally, when the internal pressure of the high pressure tank 12 (the pressure of the hydrogen gas inside the liner 16) decreases, since the pressing force by which the hydrogen gas inside the liner 16 presses the liner 16 toward the reinforced layer 18 also decreases, it becomes easy for the hydrogen gas to penetrate through the liner 16 and enter into the covered portion. More specifically, in the high pressure tank 12 which is required to be filled with the hydrogen gas, a larger amount of the hydrogen gas may enter into the covered portion in comparison with a situation in which the high pressure tank 12 is completely filled.

In such a state, when the high pressure tank 12 is filled with the hydrogen gas and the internal pressure of the high pressure tank 12 is made to increase, since the aforementioned pressing force increases, the hydrogen gas, which has entered into the covered portion in a large amount, is pushed by the liner 16, and is easily released to the exterior of the high pressure tank 12. Stated otherwise, the temporarily released gas becomes likely to be generated especially when the hydrogen gas is filled into the high pressure tank 12.

At the time of filling the hydrogen gas in this manner, the fuel lid 72 is in an opened state, and therefore, a state is brought about in which the ventilation port 58 as well as the filling port 24 are exposed to the exterior of the vehicle body 14. Consequently, it becomes possible for ventilation of the tank chamber 36 to be suitably performed through the ventilation port 58 that faces directly toward the exterior of the vehicle body 14. At this time, by driving the blower 66 and promoting ventilation of the tank chamber 36, it becomes possible to more effectively discharge the temporarily released gas from the tank chamber 36 to the exterior of the vehicle body 14.

Accordingly, with the equipped vehicle 10 according to the present embodiment, it becomes possible to suitably perform ventilation of the tank chamber 36 even at a time that filling of the hydrogen gas makes it easy for the temporarily released gas to be generated in the interior of the tank chamber 36, and for the temporarily released gas to be effectively discharged to the exterior of the vehicle body 14.

Further, at a timing exclusive of a time at which the hydrogen gas is filled, such as during traveling of the equipped vehicle 10 or the like, the ventilation port 58 is covered by the fuel lid 72 in a manner that enables ventilation. Therefore, even if the ventilation port 58 is provided so as to allow communication with the exterior of the vehicle body 14 in the manner described above, it is possible to suppress a situation in which the design of the equipped vehicle 10 deteriorates, or in which air resistance during traveling or the like is increased. Further, it is possible to prevent rainwater or the like from entering into the tank chamber 36 through the ventilation port 58.

Furthermore, since the fuel lid 72 which is an existing structure of the equipped vehicle 10 can be used to cover the ventilation port 58, for example, compared to a case in which a member (not shown) for covering the ventilation port 58 is newly provided, it is possible to prevent an increase in the number of parts, and to prevent the manufacturing process from becoming complicated.

In the equipped vehicle 10 according to the above-described embodiment, the gap 74 is formed between the fuel lid 72 that covers the opening 68 and a peripheral edge portion of the opening 68 of the outer panel 52, and the ventilation port 58 is made to communicate with the exterior of the vehicle body 14 via the gap 74. In this case, with a simple configuration in which the gap 74 is provided between the fuel lid 72 that covers the opening 68 and the peripheral edge portion of the opening 68 of the outer panel 52, the ventilation port 58 can be covered by the fuel lid 72 while enabling the ventilation port 58 to communicate with the exterior of the vehicle body 14.

However, instead of forming the gap 74 between the fuel lid 72 and the peripheral edge portion of the opening 68, a through hole (not shown) or the like may be provided in the fuel lid 72, whereby the ventilation port 58 may be covered by the fuel lid 72 while enabling the ventilation port 58 to communicate with the exterior of the vehicle body 14. At this time, a louver structure (not shown) may also be provided for the through hole of the fuel lid 72.

In the equipped vehicle 10 according to the above-described embodiment, the ventilation port 58 is disposed at a more upward location than the tank chamber 36. Since the hydrogen gas is lighter than air, the temporarily released gas tends to move from the high pressure tank 12 toward an upward location of the tank chamber 36. Therefore, by providing the ventilation port 58 at a more upward location than the tank chamber 36, it becomes possible for the temporarily released gas inside the tank chamber 36 to be suitably guided to the ventilation port 58, and be effectively discharged to the exterior of the vehicle body 14.

In the equipped vehicle 10 according to the above-described embodiment, the connecting part 48 between the ventilation passage 44 and the tank chamber 36 is disposed on the ceiling portion 50 of the tank chamber 36. In this case as well, it becomes possible for the temporarily released gas, which is hydrogen gas that is lighter than air, to be suitably guided to the ventilation passage 44, and be effectively discharged to the exterior of the vehicle body 14 through the ceiling portion 50 of the tank chamber 36.

In the equipped vehicle 10 according to the above-described embodiment, the ventilation port 58 is disposed at a more upward location than the filling port 24. In this case, as described above, even in the event that a hydrogen sensor is provided in the vicinity of the filling port 24, any concern that the temporarily released gas discharged from the ventilation port 58 could be erroneously detected by the hydrogen sensor can be dispensed with.

In the above-described equipped vehicle 10, there is further provided the blower 66 that allows air to flow from the tank chamber 36 toward the ventilation port 58. In this case, ventilation of the tank chamber 36 can be carried out more effectively through the ventilation port 58, and the temporarily released gas can be prevented from remaining in the tank chamber 36.

In the equipped vehicle 10 according to the above-described embodiment, the filling pipe 28, which forms the filling passage 26 that allows the hydrogen gas supplied from the hydrogen gas supply source to flow into the high pressure tank 12 from the filling port 24, is disposed inside the ventilation passage 44, and the concentration sensor 42 that detects the concentration of the hydrogen gas is disposed at a more upward location in the interior of the tank chamber 36 than the high pressure tank 12.

For example, it may be considered that leakage of the hydrogen gas takes place from a location such as a connecting part between the high pressure tank 12 and the filling pipe 28 where leakage of the hydrogen gas does not occur at a normal time, due to a malfunction at the location. In the case that such a leakage gas is generated, a determination is made that the high pressure tank 12 is abnormal, and the main stop valve of the high pressure tank 12 is closed.

In the manner described above, the filling pipe 28 is disposed in the interior of the ventilation passage 44 that communicates with the tank chamber 36, and the concentration sensor 42 is disposed in the tank chamber 36. Thus, when the concentration of hydrogen gas inside the tank chamber 36, which is detected by the concentration sensor 42, exceeds a predetermined magnitude, it can be determined that the leakage gas is generated and the high pressure tank 12 is abnormal.

In the equipped vehicle 10, as described above, since the tank chamber 36 can be suitably ventilated during normal operations of the high pressure tank 12, the chances of the hydrogen sensor being exposed to the temporarily released gas can be decreased. As a result, the measurement accuracy of the concentration sensor 42 can be suitably maintained, and the service life of the concentration sensor 42 can be prolonged.

The present invention is not particularly limited to the above-described embodiments, and various modifications can be made thereto within a range that does not deviate from the essence and gist of the present invention.

What is claimed is:

1. A vehicle equipped with a high pressure tank, in which there is mounted in the interior of a vehicle body a high pressure tank having a resin liner capable of storing hydrogen gas therein, and a reinforced layer that covers an outer surface of the liner, the vehicle equipped with the high pressure tank comprising:
   a tank chamber in which the high pressure tank is accommodated;
   a filling port capable of being connected to a hydrogen gas supply source provided externally of the vehicle body in order to fill the hydrogen gas into an interior of the high pressure tank;

a concave portion provided on an outer panel of the vehicle, and to which the filling port is fixed;

a fuel lid capable of opening and closing an opening of the concave portion;

a ventilation port disposed in the concave portion; and a ventilation passage that allows communication between the ventilation port and the tank chamber;

wherein, when the fuel lid is opened, the ventilation port is opened to the exterior of the vehicle body; and when the fuel lid is closed, the ventilation port is covered by the fuel lid in a state in which the ventilation port is allowed to communicate with the exterior of the vehicle body.

2. The vehicle equipped with a high pressure tank according to claim 1, wherein a gap is formed between the fuel lid that covers the opening and a peripheral edge portion of the opening of the outer panel, and the ventilation port communicates with the exterior of the vehicle body via the gap.

3. The vehicle equipped with a high pressure tank according to claim 1, wherein the ventilation port is disposed at a more upward location than the tank chamber.

4. The vehicle equipped with a high pressure tank according to claim 3, wherein a connecting part between the ventilation passage and the tank chamber is disposed on a ceiling portion of the tank chamber.

5. The vehicle equipped with a high pressure tank according to claim 1, wherein the ventilation port is disposed at a more upward location than the filling port.

6. The vehicle equipped with a high pressure tank according to claim 1, further comprising a blower configured to allow air to flow from the tank chamber toward the ventilation port.

7. The vehicle equipped with a high pressure tank according to claim 1, wherein:

a filling pipe, which forms a filling passage that allows the hydrogen gas supplied from the hydrogen gas supply source to flow into the high pressure tank from the filling port, is disposed inside the ventilation passage; and a concentration sensor configured to detect a concentration of the hydrogen gas is disposed at a more upward location inside the tank chamber than the high pressure tank.

* * * * *